United States Patent
Fedyk (10) Patent No.: US 10,462,040 B2
(45) Date of Patent: Oct. 29, 2019

(54) NON-MINIMUM COST FORWARDING FOR PACKET-SWITCHED NETWORKS

(71) Applicant: HEWLETT PACKARD ENTERPRISE DEVELOPMENT LP, Houston, TX (US)

(72) Inventor: Donald Fedyk, Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 145 days.

(21) Appl. No.: 15/500,782

(22) PCT Filed: Sep. 11, 2014

(86) PCT No.: PCT/US2014/055197
§ 371 (c)(1),
(2) Date: Jan. 31, 2017

(87) PCT Pub. No.: WO2016/039758
PCT Pub. Date: Mar. 17, 2016

(65) Prior Publication Data
US 2017/0222914 A1    Aug. 3, 2017

(51) Int. Cl.
H04L 12/721 (2013.01)
H04L 12/729 (2013.01)
(Continued)

(52) U.S. Cl.
CPC ........ *H04L 45/123* (2013.01); *H04L 12/6418* (2013.01); *H04L 43/16* (2013.01);
(Continued)

(58) Field of Classification Search
CPC ... H04L 45/122; H04L 45/123; H04L 45/125; H04L 12/6418; H04L 43/16; H04L 45/22; H04L 45/745; H04L 45/24
See application file for complete search history.

(56) References Cited

U.S. PATENT DOCUMENTS 5,233,604 A    8/1993  Ahmadi et al.
7,633,940 B1 *  12/2009 Singh .................. H04L 45/12
                                                            370/237
(Continued)

FOREIGN PATENT DOCUMENTS

EP    2451127 A1    5/2012
KR    20050046272 A    5/2005
WO    WO-2005053234 A1    6/2005

OTHER PUBLICATIONS

Shihong Xu and Hong Shen, "QoS-oriented Content Delivery in eLearning Systems," Aug. 2009, pp. 665-670, The University of Adelaide, Australia, IEEE.
(Continued)

*Primary Examiner* — Ian N Moore
*Assistant Examiner* — Justin T Van Roie
(74) *Attorney, Agent, or Firm* — Hewlett Packard Enterprise Patent Department (57) ABSTRACT

In some examples, a network node receives a packet from an adjacent node in a packet-switched network. The receiving node can forward the packet to a destination node via a minimum cost forwarding node adjacent to the network node or to a non-minimum cost forwarding node adjacent to the network node based on routing criteria for the packet-switched network. The routing criteria can include whether the adjacent node that sent the packet to the receiving node is a non-minimum cost node between a source node and the destination node for the packet.

18 Claims, 7 Drawing Sheets

(51) Int. Cl.
*H04L 12/707* (2013.01)
*H04L 12/64* (2006.01)
*H04L 12/26* (2006.01)
*H04L 12/733* (2013.01)
*H04L 12/741* (2013.01)

(52) U.S. Cl.
CPC .......... *H04L 45/122* (2013.01); *H04L 45/125* (2013.01); *H04L 45/22* (2013.01); *H04L 45/24* (2013.01); *H04L 45/745* (2013.01)

(56) References Cited

U.S. PATENT DOCUMENTS

| | | | | |
|---|---|---|---|---|
| 8,537,677 | B2* | 9/2013 | Ahn | ........................ H04L 45/00 370/232 |
| 8,699,350 | B1 | 4/2014 | Kumar et al. | |
| 2005/0165957 | A1* | 7/2005 | Choi | ..................... H04L 45/122 709/238 |
| 2007/0183334 | A1 | 8/2007 | White et al. | |
| 2009/0088072 | A1 | 4/2009 | Rofougaran et al. | |
| 2009/0285107 | A1* | 11/2009 | Sakurai | ................. B60W 50/02 370/242 |
| 2012/0176900 | A1 | 7/2012 | Steer et al. | |
| 2012/0213224 | A1* | 8/2012 | Chen | ....................... H04L 45/04 370/390 |
| 2013/0064102 | A1* | 3/2013 | Chang | ..................... H04L 49/70 370/244 |
| 2014/0204823 | A1 | 7/2014 | Merlin et al. | |
| 2015/0003247 | A1* | 1/2015 | Mejia | ..................... H04L 47/12 370/235 |
| 2017/0142226 | A1* | 5/2017 | De Foy | ............... H04L 45/7453 |

OTHER PUBLICATIONS

Dragos Niculescu and Badri Nath, "Trajectory Based Forwarding and its Applications," MobiCom, Sep. 2003, pp. 260-272, ACM.
International Search Report and Written Opinion, International Application No. PCT/US2014/055197, dated May 8, 2015, pp. 1-9, KIPO.

* cited by examiner

NON-MINIMUM COST FORWARDING FOR PACKET-SWITCHED NETWORKS

BACKGROUND

Computer networks can be used to allow networked devices, such as personal computers, servers, and data storage devices, to exchange data. Computer networks often include intermediary data path devices such as network switches, gateways, and routers to flow traffic along selected data routing paths between networked devices. A data routing path can, for example, be selected by a network controller, administrator, or another entity, and can, for example, be based on network conditions, network equipment capabilities, or other factors.

DETAILED DESCRIPTION

Networks can be designed to ensure that network resources are used efficiently. For example, networks can be designed to provide for acceptable bandwidths, latencies, error rates, jitter rates, etc., for data traffic over the network. Such network design can be especially useful for time-sensitive network services, such as high speed computing networks where nodes connect compute servers, real-time multimedia services including Internet Protocol television (IPTV), video calls, online gaming, security camera streams, Voice over IP (VoIP) traffic, or other services.

In order to achieve desired network characteristics, network administrators can choose to route data along pre-defined data paths between a source node and a destination node that include one or more intermediary nodes, such as network switches. The predefined paths can, for example be pre-computed from an existing network topology. A network administrator can, for example, choose to route traffic along a "minimum cost" data path between a source node and a destination node. As described further herein with respect to various implementations, the term "cost" as applied to data paths can refer to a desirability of using a given path based on one or more metrics of the path, such as a number of hops to reach a destination node, link speed, current or predicted load, reliability, latency, etc. Values corresponding to such a "cost" metric can, for example, be in the form of a positive integer value. As a simple example, a data path with a hop count of two may be considered a "minimum cost" data path compared to other data paths with a hop count of four. The term "hop count" can, for example, correspond to the number of intermediate devices (e.g., switches) through which data passes between two network nodes. As another example, in some implementations, a minimum cost data path between a source and destination can be identified as a most efficient data path expressed as a minimized sum of all source and destination traffic measured as the product of traffic (e.g., bytes sent) over the links in the network for a given traffic load.

A link speed between two nodes can be considered an upper limit for data transfer between two nodes along a single data path. However, a network administrator may seek to flow data along multiple data paths between the two nodes in order to alleviate congestion within the network or to achieve other desired network characteristics. That is, the use of multiple paths between two nodes can allow a bandwidth between the nodes to exceed the bandwidth of a single link between nodes. For example, the use of a first link between two nodes with a 10 GBit/s link speed along with a second link between the nodes with a 100 GBit/s link speed can provide for an overall maximum link speed of 110 GBit/s. This can be accomplished for example using two direct links between the two nodes, or with a first direct link between the two nodes and a second link that passes from the first node to the second node through an intermediary node. When an intermediary node is used, the network traffic can be said to be routed along a "non-minimum cost" data path. Network routing that relies on such non-minimum cost data paths must be carefully designed, as such paths can result in undesirable network behavior, such as increased latency between host devices and forwarding loops.

Certain implementations of the present disclosure can address the above issues by providing non-minimum cost based forwarding rules that allow non-minimum cost paths to be utilized for multipath data transfer without forwarding loops. In some implementations, this is accomplished by providing that a non-minimum cost path can only be used once before a shortest path is used for at least one hop. That is, if a packet arrives at a network node as being forwarded from a non-minimum hop, the next hop is selected along a shortest path neighbor for that packet. This can, in some situations, ensure that forwarding loops are not formed. In some implementations, traffic can be permitted to flow across more than one non-minimum hops (e.g., two adjacent upstream nodes) before being routed along a minimum cost path. In some implementations of the present disclosure, the routing of packets is connectionless. The term "connectionless" as used herein can, for example, refer to a data transmission method used in packet switching networks by which each data unit is individually addressed and routed based on information carried in each unit, rather than in the setup information of a prearranged, fixed data path. In some implementations of the present disclosure, the packets are routed according to pre-computed source paths and packet forwarding devices such as switches are source aware. The term "source aware" as used herein can, for example, refer to network routing in which switches and other packet forwarding devices within the network are aware of an original source of a packet. Other advantages of the solutions presented herein will be apparent upon review of the description and figures.

Figure 1:
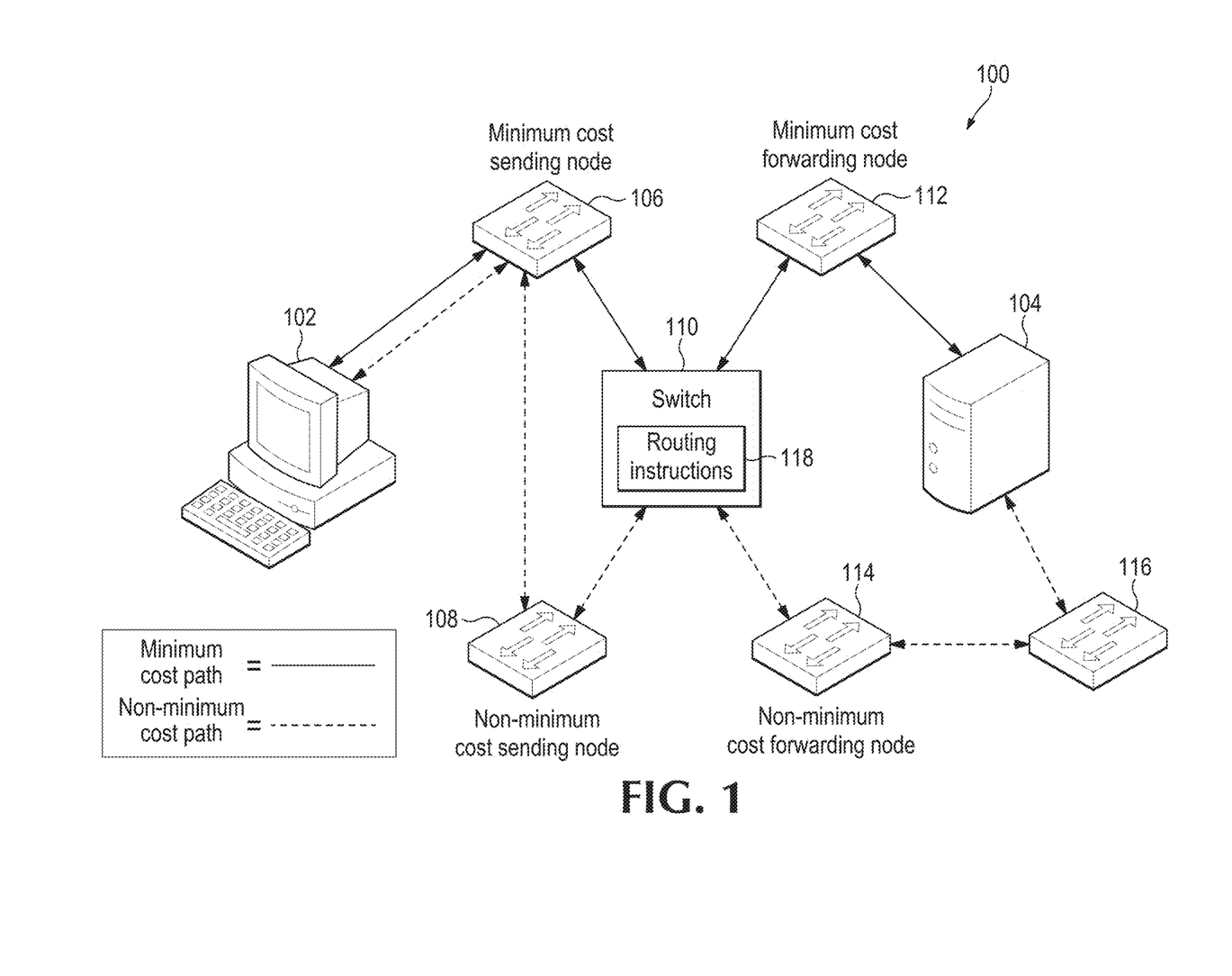
FIG. 1 is a diagram of a network including a switch with routing instructions, according to an example.

FIG. 1 is a diagram of a network 100 containing a source node 102 in communication with a destination node 104 via multiple switches 106, 108, 110, 112, 114, and 116 and connected using wired or wireless data links. Although a single link between each node is illustrated, it is appreciated that each single link may include multiple wires or data channels. As described further below for example with respect to FIG. 2 and its related methods, switch 110 includes machine-readable routing instructions 118 for non-minimum cost forwarding of network data. Although only a single switch 110 of network 100 is described as including such routing instructions, it is appreciated that certain implementations of the disclosure provided herein can be especially suitable to networks in which each node of the network has local computing functionality. For example, in some implementations, multiple switches within network 100 include such instructions and functionality, and in some implementations, every switch in network 100 includes such instructions and functionality. In some implementations, the disclosure provided herein can be applicable to networks where the topology is exchanged between nodes such as a link state internal gateway protocol (e.g., IS-IS, OSPF, etc.) or a software-defined network. For example, several implementations of the present disclosure for software-defined networks are described below with respect to FIGS. 6-9.

Source node 102 and destination node 104 can, for example, be in the form of network hosts or other types of network nodes. For example, source node 102 and destination node 104 can be in the form of suitable servers, desktop computers, laptops, printers, etc. As an example, source node 102 can be in the form of a standalone storage server appliance, with destination node 104 being in the form of a desktop computer including a monitor for presenting information to an operator and a keyboard and mouse for receiving input from an operator. It is appreciated that source node 102 and destination node 104 can be endpoint nodes on network 100, intermediate nodes between endpoint nodes, or other types of network nodes.

Switches 106, 108, 110, 112, 114, and 116 can, for example, be in the form of multi-port network bridges that process and forward data at the data link layer. In some implementations, one or more of the switches can be in the form of multilayer switches that operate at multiple layers of the OSI model (e.g., the data link and network layers). Each switch can, for example, help manage the flow of data across a network by only transmitting a received message to a destination device for which the message was intended (or to an intermediary device en route to the destination device). In order to achieve this functionality, switches in network 100 can, in some implementations, rely on flow entries in flow tables stored on a machine-readable medium within each switch (or otherwise accessible by each switch). Each flow entry in a flow table can, for example, contain information such as: (1) match fields to match against packets (e.g., an ingress port and packet headers), (2) a priority value for the flow entry to allow prioritization over other flow entries, (3) counters that are updated when packets are matched, (4) instructions to modify the action set or pipeline processing, and (5) timeouts indicating a maximum amount of time or idle time before a flow is expired by the switch. When the flow is not locally terminating the flow match can produce a result that is mapped into a hash table for the next hop link selection.

Although the term "switch" is used throughout this description, it is appreciated that this term can refer broadly to other suitable network data forwarding devices. For example, a general purpose computer can include suitable hardware and machine-readable instructions that allow the computer to act as a network switch for network 100. It is appreciated that the term "switch" can include other network data path elements in the form of suitable routers, gateways and other devices that provide switch-like functionality for network 100.

Data between source node 102 and destination node 104 can flow along distinct data paths within network 100. For example, a first path (referred to herein as a minimum cost path and depicted using solid lines in FIG. 1) between source node 102 and destination node 104 can flow data along switches 106, 110, and 112, and a second path (referred to herein as a non-minimum cost path and depicted using broken lines in FIG. 1) can flow data along switches 106, 108, 110, 114, and 116. As described above, the terms "minimum" and "non-minimum" as used herein with reference to data paths and network nodes can correspond to a desirability of transmitting data over the data path or node en route to a destination node.

For ease of description, the costs of the two data paths of FIG. 1 are based on the hop count between source node 102 and destination node 104. As described above, the term "hop count" can, for example, correspond to the number of intermediate devices (e.g., switches) through which data passes between source node 102 and destination node 104. In the example network of FIG. 1, the minimum cost path includes four hops to reach destination node 104 from source node 102, whereas the non-minimum cost path includes six hops to reach destination node 104 from source node 102. As described for example with respect to the method of FIG. 2 below, other metrics for data path "cost" can be used, such as link speed, load, reliability, latency, etc. Implementations of non-minimum cost forwarding of data packets in network 100 by switch 110 will now be described with reference to the flowchart of FIG. 2.

Figure 2:
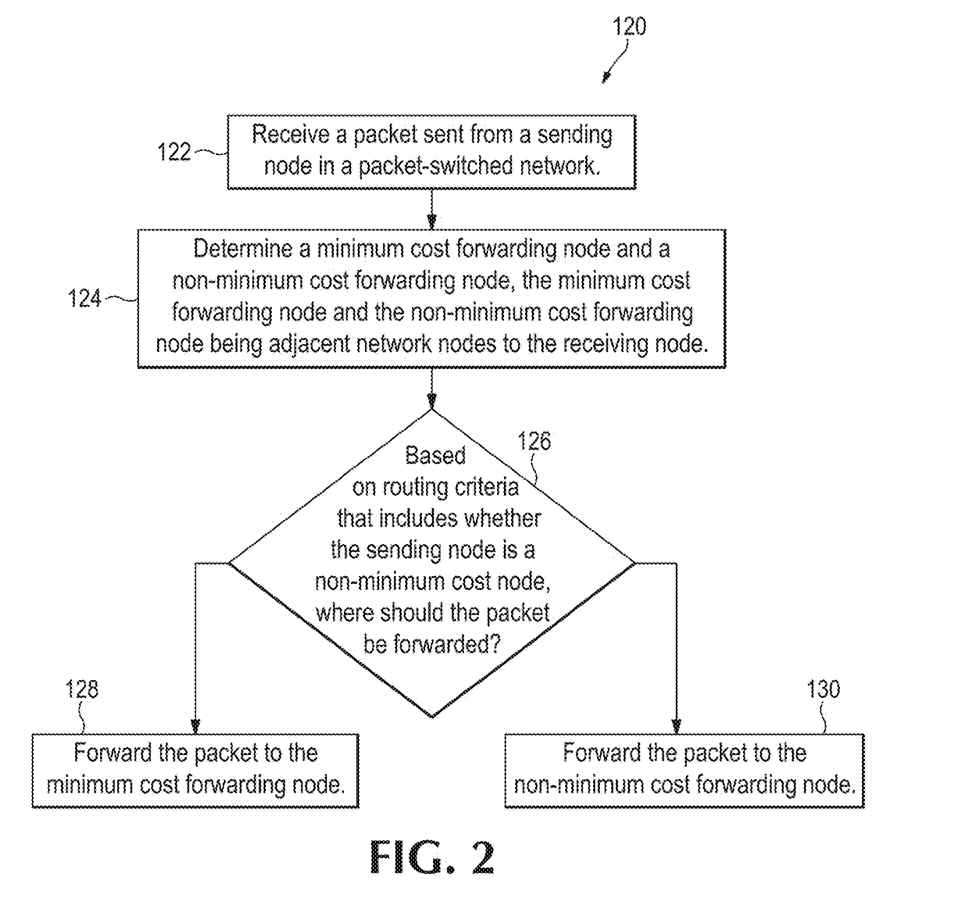
FIG. 2 is a flowchart illustrating a method, according to an example.

FIG. 2 illustrates a flowchart for a method 120 relating to routing data between source node 102 and destination node 104. The description of method 120 and its component steps make reference to elements of example network 100, such as switch 110 for illustration, source node 102, and destination node 104, however, it is appreciated that this method can be used or otherwise applicable for any suitable network or network element described herein or otherwise. For example, this method can, for example, be applied to computer networks with different network topologies, such as those illustrated in FIGS. 6 and 9.

Method 120 includes a step 122 of a receiving node (switch 110 in this example) receiving a packet sent from a sending node (either switch 106, which is the minimum cost sending node or switch 108, which is the non-minimum cost sending node). As depicted in FIG. 1, receiving node 110 and sending node (switch 106 or switch 108) are adjacent network nodes in network 100. The packet sent by the sending node, for example, can include control data and payload data. Control data can, for example, provide data to assist receiving node 110 with reliably delivering the payload data. For example, control data can include network addresses for source node 102 and destination node 104, error detection codes, and sequencing information. Payload data can include data carried on behalf of an application for use by source node 102 or destination node 104. In some implementations, the packet can be received by receiving node 110 via a communication port, such as an Ethernet port. It is appreciated that other types of ports can be used to receive a packet from the sending node, such as a Fibre Channel port. It is further appreciated that one or more ports on receiving node 110 can be in the form of a virtual port.

Method 120 includes a step 124 of determining, for destination node 104, a minimum cost forwarding node (switch 112 in this example) that is adjacent to receiving node 110 and a non-minimum cost forwarding node (switch 114 in this example) that is adjacent to receiving node 110. In the example network 100 of FIG. 1, only two switches are adjacent to switch 110 between switch 110 and destination node 104, but it is appreciated that in some networks, there may be more than two such adjacent switches. One example, of such a network is described below with respect to FIG. 9. The description of step 124 and other steps of method 120 can be applicable to such networks to allow for a determination between more than two adjacent forwarding nodes.

In some implementations, determining a minimum cost forwarding node and a non-minimum cost forwarding node is based on a number of hops between the minimum cost forwarding node and the destination node and a number of hops between the non-minimum cost forwarding node. For example, in network 100 of FIG. 1, the minimum cost forwarding node is switch 112 (which uses one hop to reach destination node 104) and the non-minimum cost forwarding node is switch 114 (which uses two hops to reach destination node 104).

Figure 9:
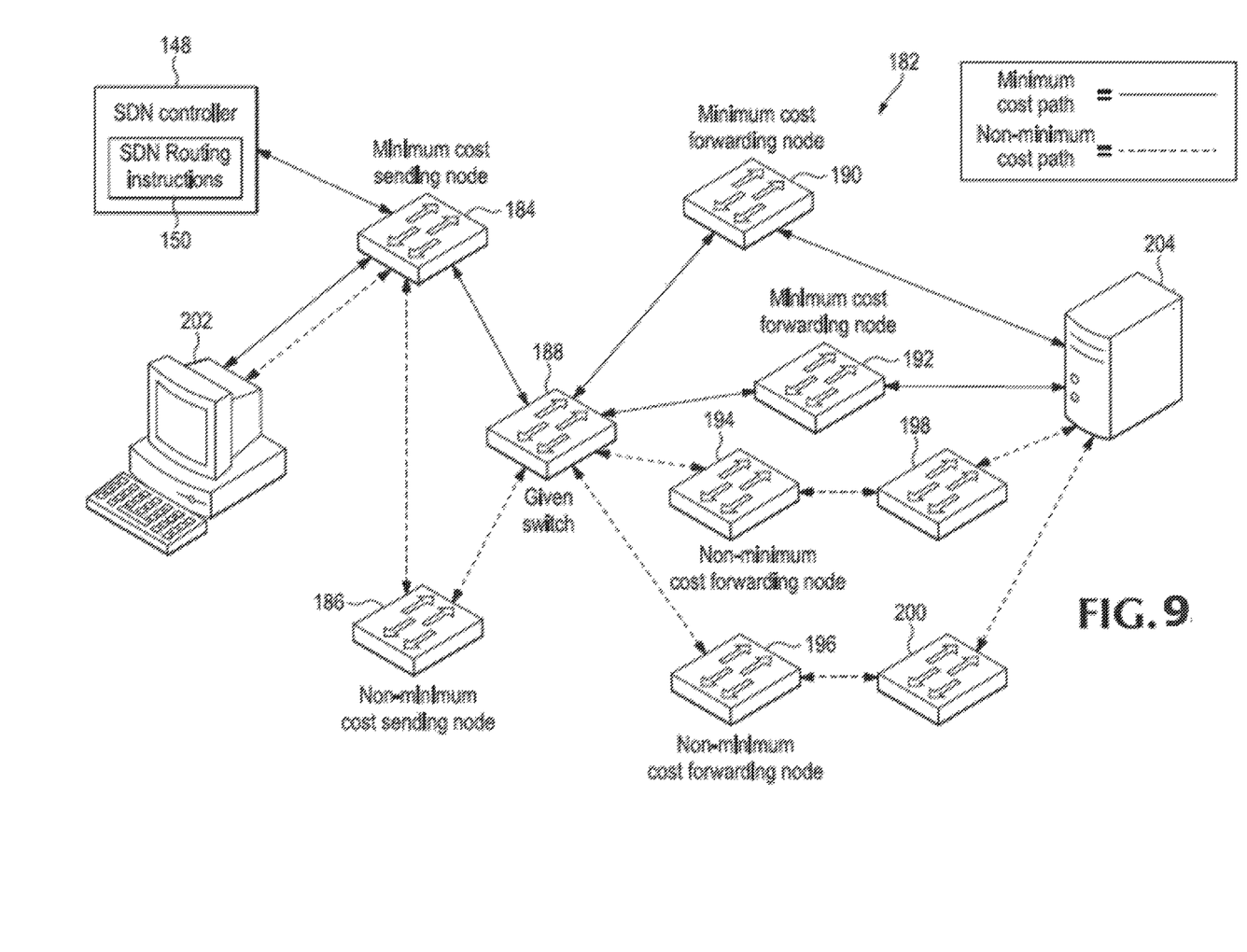
FIG. 9 is a diagram of a software-defined network including a software-defined network controller with routing instructions, according to an example.

In some implementations, however, determining a minimum cost forwarding node and a non-minimum cost forwarding node is based on a number of available paths between the minimum cost forwarding node and the destination node and a number of available paths between the non-minimum cost forwarding node. One example of such a network is depicted in FIG. 9, which is described in further detail below. For example, it is appreciated that in some networks, a first potential forwarding node may allow for a packet to reach destination node 104 along two separate paths, whereas a second potential forwarding node may allow for the packet to reach destination node 104 along only a single path. Because the first potential forwarding node includes multiple paths to destination node 104, the application of this metric for "cost," may result in the first potential forwarding node being considered a lower cost node than the second potential forwarding node because the first potential forwarding node has a backup route in case one of its paths is disrupted.

In some implementations, determining a minimum cost forwarding node and a non-minimum cost forwarding node is based on an overall link speed between the minimum cost forwarding node and destination node 104 and an overall link speed between the non-minimum cost forwarding node. For example, a first path can have an overall link speed of 100 Gbit/s, whereas a second path can have an overall link speed of 10 Gbit/s. In this example, the forwarding node along the first path can be considered the minimum cost forwarding node. The overall link speed can, for example, be determined based on the link speeds for each link along the path. For example, with reference to network 100, if the link speed between switch 110 and switch 112 in network 100 is 10 Gbit/s and the link speed between switch 112 and switch 114 is 100 Gbit/s, the overall link speed along this route can be calculated as 10 Gbit/s as it is the lowest link speed along the route. For certain topologies, such as those where a potential forwarding node includes parallel data paths to destination node 104, an overall link speed for the path may be calculated based on the single largest link speed among the parallel data paths, or as a function of multiple of the parallel data paths.

It is appreciated that determining a minimum cost forwarding node and a non-minimum cost forwarding node can be based on multiple factors. For example, a cost can be determined using a weighted combination of: (1) the number of hops between a potential forwarding node and destination node 104, (2) the number of data paths between a potential forwarding node and destination node 104, and (3) the overall link speed between a potential forwarding node and destination node 104. As but one example, aspect (1) can account for 50% of the total cost, aspect (2) accounting for 20% of the total cost, and aspect (3) accounting for 30% of the total cost. It is appreciated that any other suitable metrics or techniques can be used to determine relative costs between a first potential forwarding node and a second potential forwarding node.

Method 120 includes a step 126 of determining, based on routing criteria (examples of which are described below) for network 100 that includes whether the sending node is a non-minimum cost node between source node 102 and destination node 104 for the packet, whether the packet should be forwarded to minimum cost forwarding node 112 or to non-minimum cost forwarding node 114. Although this disclosure describes receiving node 110 performing this determination for illustration, it is appreciated that in some implementations, the determination (and/or other steps of method 120) can be performed by another node in the network (e.g., source node 102, destination node 104, switch 110, etc.), a network controller (see, e.g., description of software-defined networking controllers below with respect to FIGS. 6-9), a network administer, or another individual or computing device.

In some implementations, a packet is marked by the sending node, another network node, or another suitable computing device, to indicate whether the sending node is a minimum cost node or a non-minimum cost node between source node 102 and destination node 104. In such implementations, receiving node 110 can determine whether the sending node is a non-minimum cost node based on the marking. In some implementations, determining whether the sending node is a non-minimum cost node between source node 102 and destination node 104 can be based on an ingress port of the packet at receiving node 110. For example, in some implementations, receiving node 110 can determine that packets routed between source node 102 and destination node 104 should arrive at receiving node 110 via a given port (e.g., a first Ethernet port) and that any packets arriving at another port (e.g., a second Ethernet port) arrive from a non-minimum cost node between source node 102 and destination node 104.

The routing criteria can, for example, indicate that the packet should be forwarded to minimum cost forwarding node 112 when the sending node (e.g., switch 108 in FIG. 1) is a non-minimum cost node between source node 102 and destination node 104. This way, receiving node 110 can route the packet along a minimum cost path to destination node 104 if the previous hop of the packet is determined to be a non-minimum cost node. In some implementations, such as certain implementations where every switch between source node 102 and destination node 104 includes routing instructions 118, forwarding loops can be prevented from forming in network 100.

Although routing instructions can be designed to generally route data packets to the minimum cost forwarding node, as described above, it is appreciated that there are circumstances where it can be advantageous to forward data packets to a non-minimum cost forwarding node. For example, in some implementations, the routing criteria can indicate that the packet should be forwarded to non-minimum cost forwarding node 114 when: (1) sending node (e.g., switch 106 in FIG. 1) is a minimum cost sending node between source node 102 and destination node 104, (2) a predicted congestion along a minimum cost path to destination node 104 that includes minimum cost forwarding node 112 is above a predetermined threshold, and (3) a predicted congestion along a non-minimum cost path to destination node 104 that includes non-minimum cost forwarding node 114 is below a predetermined threshold. The term "congestion" used in the context of networks can, for example, refer generally to situations where a link or node is carrying so much data that its quality of service deteriorates. In some situations, queuing delays, packet loss, or blocking of new connections can occur in response to network congestion.

Figure 5:
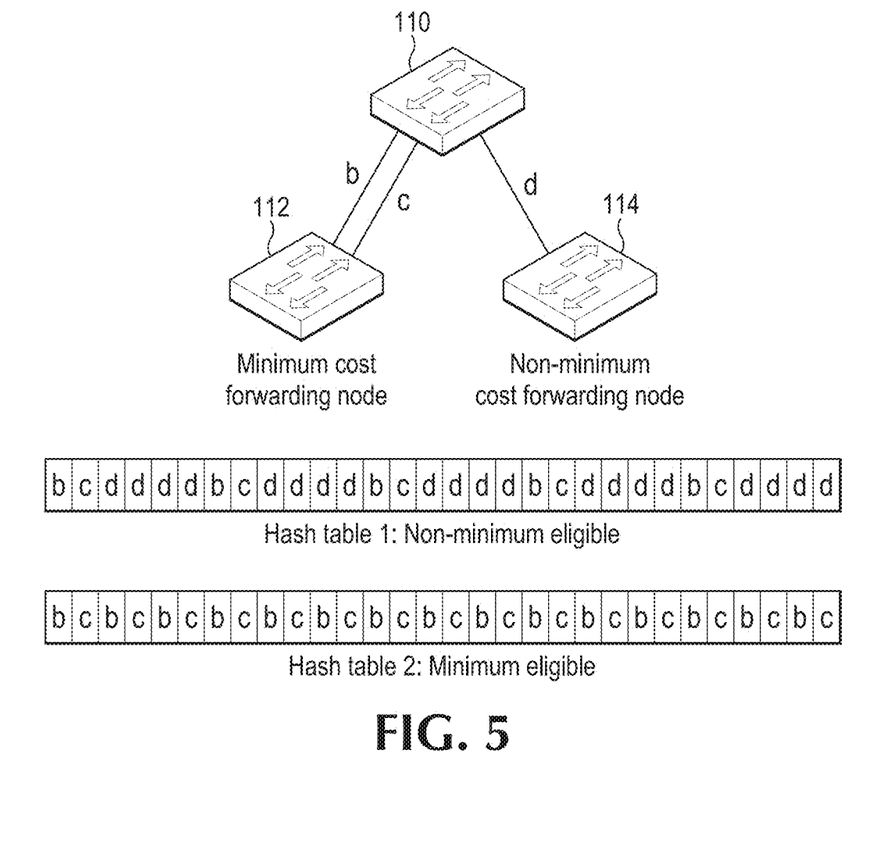
FIG. 5 is a diagram illustrating forwarding hash tables for a switch, according to an example.

As an example, if a potential forwarding node is determined to be a non-minimum cost forwarding node because greater cost to the destination than another switch, a packet can be routed from receiving node 110 to the potential forwarding node if: (1) the sending node is a minimum cost sending node between source node 102 and destination node 104, (2) local criteria stored on receiving node 110 allows receiving node 110 to determine the minimum cost path to be insufficient, and (3) predicted congestion along an otherwise non-minimal cost path including a non-minimum cost forwarding node is below a predetermined threshold. In some implementations, an otherwise minimum cost path can be determined to be insufficient if a predicted congestion along the path is above a predetermined threshold In some implementations, receiving node 110 can use pre-computed hash tables to select a forwarding node. As described further below, FIG. 5 illustrates an example of such pre-computed hash tables.

In some implementation, all minimum-cost paths and all non-minimum cost paths can be calculated. Two sets of lookup tables (e.g., per destination for each port) can be provided on receiving node 110. The first set of lookup tables can correspond to a minimum lookup table, and can be populated per valid destination nodes with only minimum next hop neighbors. The second set of lookup tables can correspond to a non-minimum lookup table, and can also be populated for all valid destination nodes (with a mix of minimum and non-minimum next hop neighbors). The selection of which table to use for forwarding can, for example, be dependent on the source node of the packet. That is, if the packet arrives from a shortest path hop for that packet source, switch 110 can route the packet along a non-minimum cost path. It is appreciated that the selection of which table to use and how that table is populated can further be based on whether each potential path satisfies certain congestion thresholds as described above.

Method 120 includes alternative steps of forwarding the packet to the minimum cost forwarding node (step 128) or forwarding the packet to the non-minimum cost forwarding node (step 130) based on the determination of step 126. In some implementations, the packet can be forwarded by receiving node 110 via a communication port, such as an Ethernet port. This port can, for example, be the same port upon which receiving node 110 originally receives the packet or another suitable port. It is further appreciated that the port can be in the form of a virtual port. Although the flowchart of FIG. 2 and description of method 120 identify one order of performance, it is appreciated that this order may be rearranged into another suitable order, may be executed concurrently or with partial concurrence, include additional or comparable steps to achieve the same or comparable functionality, or a combination thereof.

Some implementations of method 120 can be used to leverage properties of non-minimum cost based forwarding for a three node interconnection (triangular connection) involving at least three nodes. For example, method 120 can be especially suitable in networks including triangular connections between nodes because such connections can allow for balanced traffic load through the use of switching nodes that make use of symmetric non-minimum forwarding on unequal cost based paths. That is, in such networks, each node can have a "protecting" triangle formed by being connected to two other adjacent nodes. Such an arrangement can thereby eliminate a single link as a bottleneck between nodes. However, it is appreciated that in some implementations, method 120 can be applied to a network in which each node does is not connected to two other nodes. For example, in some implementations, method 120 can be applied to a network in which a given node is connected to just a single node. It is appreciated that one or more steps of method 120 can be precomputed in order to expedite processing and forwarding of packets. As but one example, step 124 of determining an adjacent minimum cost forwarding node and an adjacent non-minimum cost forwarding node can be computed before a packet is received at receiving node 110.

Implementations of the disclosure provided herein can be particularly suitable for use with networks where there is "any to any" connectivity. The term "any to any" can, for example, refer to nodes in the network being able to source and sink traffic as well as forward transit traffic. For example, certain high speed computing networks can be designed with such any to any connectivity. In contrast, certain networks can provide for pure transit nodes. For example certain fat tree networks with spine and leaf can provide pure transit nodes. Such networks can maximize equal cost paths by using dedicated switching nodes or transit nodes, which can lead to increased costs.

Figure 3:
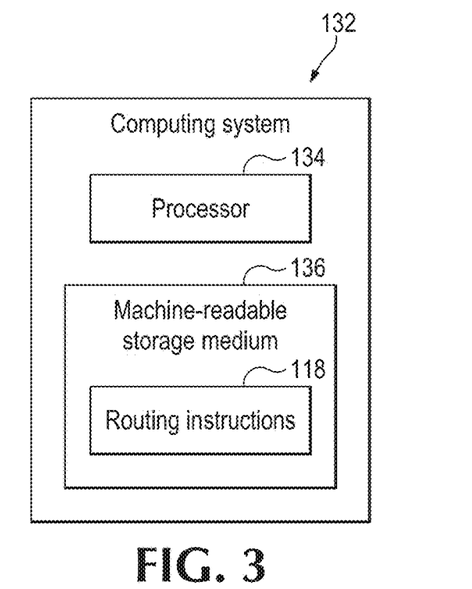
FIG. 3 is a diagram of a computing system that includes routing instructions, according to an example.

FIG. 3 illustrates an example of a computing system 132 for running routing instructions 118 in accordance with the present disclosure. Computing system 132 can, for example, be used to provide switch functionality for a network by executing one or more steps of method 120 described above. The description of computing system 132 refers to elements of network 100 for illustration, however, it is appreciated that computing system 132 can be used with any suitable network. Computing system 132 includes a processor 134 and machine-readable storage medium 136 as described further below. It is appreciated that computing system 132 can include additional elements, such as input/output (I/O) devices, a communication interface, etc. It is appreciated that one or hardware or software elements for switch 110 described herein may be implemented in computing system 132.

Computing system 132 can be in the form of a network switch, gateway, router, or other suitable network data path element. Computing system 132 can, for example, be designed for use in a suitable home or office environment outside of a wiring closet, a rack-mounted form factor for mounting in an equipment rack, a chassis form factor including swappable module cards, or another suitable form factor. In some implementations, software that provides the functionality of switch 110 can be stored on machine-readable storage medium 136 of computing system 132 to be executed by processor 134 of computing system 132.

Processor 134 of computing system 132 can, for example, be in the form of a central processing unit (CPU), a semiconductor-based microprocessor, a digital signal processor (DSP) such as a digital image processing unit, other hardware devices or processing elements suitable to retrieve and execute instructions stored in medium 136, or suitable combinations thereof. Processor 134 can, for example, include single or multiple cores on a chip, multiple cores across multiple chips, multiple cores across multiple devices, or suitable combinations thereof. Processor 134 can be functional to fetch, decode, and execute instructions as described herein. As an alternative or in addition to retrieving and executing instructions, processor 134 can, for example, include at least one integrated circuit (IC), other control logic, other electronic circuits, or suitable combination thereof that include a number of electronic components for performing the functionality of instructions stored on medium 136. Processor 134 can, for example, be implemented across multiple processing units and instructions may be implemented by different processing units in different areas of computing system 132.

Medium 136 of computing system 132 can, for example, be in the form of a non-transitory machine-readable storage medium, such as a suitable electronic, magnetic, optical, or other physical storage apparatus to contain or store information such as routing instructions 118. Routing instructions 118 can be machine readable instructions executable by processor 134 such that computing system 132 is operative to perform one or more functions described herein, such as those described above with respect to method 120.

Medium 136 can, for example, be housed within the same housing as processor 134 for computing system 132, such as within a computing tower case for computing system 132. In some implementations, medium 136 and processor 134 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, medium 136 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that instructions and data can be stored on separate machine-readable storage mediums and multiple mediums can be treated as a single medium 136 for purposes of description.

Figure 4:
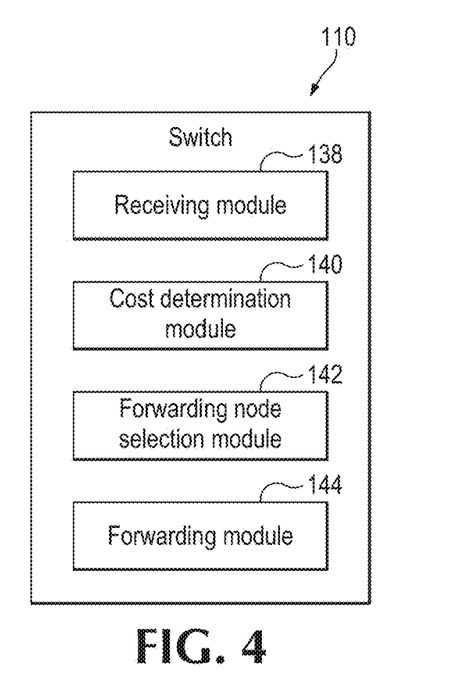
FIG. 4 is a diagram of a switch, according to an example.

FIG. 4 illustrates switch 110 in the form of functional modules that can, for example, be operative to execute one or more steps of method 120 described above. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules. Each module of switch 110 can include one or more machine-readable storage mediums, such as medium 136, and one or more computer processors, such as processor 134. For example, software that provides the functionality of modules on switch 110 can be stored on a memory of a computer to be executed by a processor of the computer.

Switch 110 includes a receiving module 138, cost determination module 140, forwarding node selection module 142, and forwarding module 144, as described further below.

It is appreciated that other modules can be added to switch 110 for additional or alternative functionality. Receiving module 138 of switch 110 includes a combination of hardware and software to allow switch 110 to communicate with network nodes of network 100 and to receive a packet sent from an upstream node in network 100. Receiving module 138 can, for example, include one or more machine-readable storage mediums, such as medium 136, and one or more computer processors, such as processor 134, to implement one or more aspects of step 122 (or other steps) of method 120 described above.

In some implementations, switch 110 can include a routing exchange module to exchange topology information, such as link connection, costs and nodes to other the nodes in the network. A link state protocol, such as OSPF and IS-IS, can for example be used for this task. In some implementations, any suitable form of routing that can deliver network topology from which data paths can be computed can be used for this task. The routing exchange module can, for example, exchange updates as a network's topology changes. Receiving module 138 can be implemented for use as a wired or wireless communication interface. In some implementations, receiving module 138 contains one or more physical data ports to connect to elements of network 100. For example, in some implementations, receiving module 138 can include a network interface controller having an Ethernet port. Receiving module 138 can, in some implementations, provide for virtual network ports. In some implementations, receiving module 138 includes hardware in the form of a hard drive, related firmware, and other software for allowing the hard drive to operatively communicate with other hardware of switch 110. Receiving module 138 can include information for use with receiving module 138, such as firmware for implementing physical or virtual network ports.

Cost determination module 140 of switch 110 determines, for a destination node of the packet, a minimum cost forwarding node adjacent to the network switch and a non-minimum cost forwarding node adjacent to the network switch. Cost determination module 140 can, for example, include one or more machine-readable storage mediums, such as medium 136, and one or more computer processors, such as processor 134, to implement one or more aspects of step 124 (or other steps) of method 120 described above. In some implementations, cost determination module 140 includes hardware in the form of a hard drive, related firmware, and other software for allowing the hard drive to operatively communicate with other hardware of switch 110. Cost determination module 140 can include information for use with cost determination module 140, which can include instructions for determining minimum and non-minimum cost forwarding nodes.

Forwarding node selection module 142 of switch 110 determines, based on routing criteria for the packet-switched network that includes whether the upstream node is a non-minimum cost node between a source node and the destination node for the packet, whether the packet should be forwarded to the minimum cost forwarding node or to the non-minimum cost forwarding node. Forwarding node selection module 142 can, for example, include one or more machine-readable storage mediums, such as medium 136, and one or more computer processors, such as processor 134, to implement one or more aspects of step 126 (or other steps) of method 120 described above. In some implementations, forwarding node selection module 142 includes hardware in the form of a hard drive, related firmware, and other software for allowing the hard drive to operatively communicate with other hardware of switch 110. Forwarding node selection module 142 can include information for use with forwarding node selection module 142, such as routing criteria.

Forwarding module 144 of switch 110 forwards the packet to the minimum cost forwarding node when it is determined that the packet should be forwarded to the minimum cost forwarding node and to forward the packet to the non-minimum cost forwarding node when it is determined that the packet should be forwarded to the non-minimum cost forwarding node. Forwarding module 144 can, for example, include one or more machine-readable storage mediums, such as medium 136, and one or more computer processors, such as processor 134, to implement one or more aspects of steps 128 and 130 (or other steps) of method 120 described above. Forwarding module 144 can be implemented for use as a wired or wireless communication interface. In some implementations, forwarding module 144 contains one or more physical data ports to connect to elements of network 100. For example, in some implementations, forwarding module 144 can include a network interface controller having an Ethernet port. In some implementations, forwarding module 144 includes hardware in the form of a hard drive, related firmware, and other software for allowing the hard drive to operatively communicate with other hardware of switch 110. Forwarding module 144 can include information for use with forwarding module 144, such as firmware for using physical or virtual communication ports.

It is appreciated that forwarding module 144 can, in some implementations, share hardware, software, or data with receiving module 138 or another module. For example, in some implementations, forwarding module 144 can share the use of a single Ethernet port with receiving module 138, whereas in some implementation, forwarding module 144 and receiving module 138 use separate Ethernet ports. It is appreciated that any modules can share hardware, software, or data with any other module in order to achieve their respective objectives.

FIG. 5 is a diagram illustrating examples of a first and second hash table for use by a switch in forwarding packets to a minimum or non-minimum cost forwarding node. For illustration, the description of FIG. 5 makes reference to elements of example network 100, such as switch 110. However, it is appreciated that this description can be applicable for any suitable network or network element described herein or otherwise. In this example, each hash table indicates forwarding paths for packets received at switch 110. As described above, switch 110 can include instructions to route packets along a non-minimum cost path based on whether an adjacent upstream node is itself a minimum or non-minimum cost sending node. As described above, the determination as to whether an adjacent upstream node is a minimum or non-minimum cost sending node can be based on an ingress port of switch 110 or other criteria.

If switch 110 determines that a packet should be forwarded to a non-minimum cost sending node, switch 110 refers to hash table 1 for further forwarding information. If switch 110 determines that a packet should be forwarded to a minimum cost sending node, switch 110 refers to hash table 2 for further forwarding information. With reference to hash tables 1 and 2, a hash table value of b indicates that the packet should be forwarded to minimum cost forwarding node 112 via route b, a hash table value of c indicates that the packet should be forwarded to minimum cost forwarding node 112 via route c, and a hash table value of d indicates that the packet should be forwarded to non-minimum cost forwarding node 114 via route d.

As depicted in hash table 1, in some implementations, switch 110 can be instructed to route some received packets to minimum cost forwarding node 112 in addition to non-minimum cost forwarding node 114 even if the packets are eligible for routing to the non-minimum cost forwarding node. However, as depicted in hash table 2, in this example, if a packet is eligible for minimum cost forwarding, the packet will be forwarded only to minimum cost forwarding node 112. Similarly, in certain implementations, if a packet is eligible for non-minimum cost forwarding, hash table 2 can be provided to instruct switch 110 to only forward the packet to a non-minimum cost forwarding node.

Figure 6:
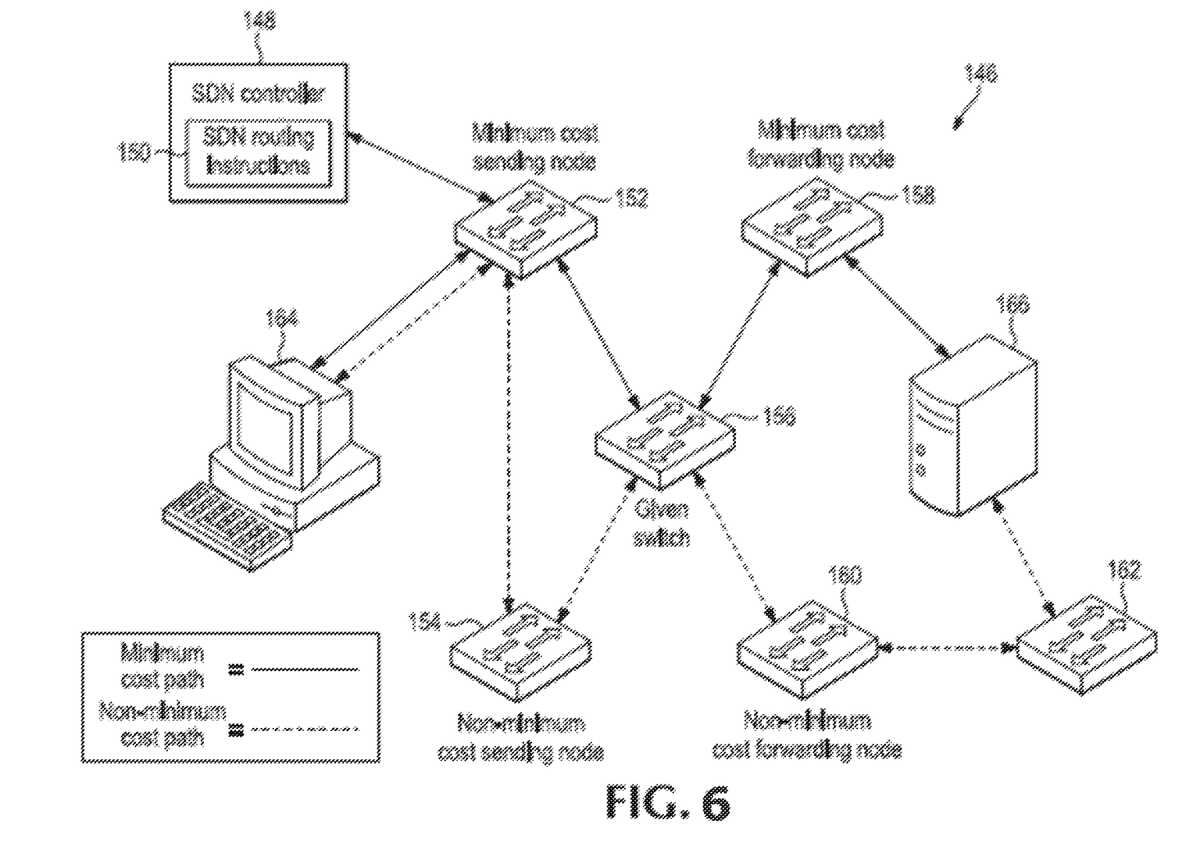
FIG. 6 is a diagram of a software-defined network including a software-defined network controller with routing instructions, according to an example.

FIG. 6 is a diagram of an example software-defined network (SDN) 146 including an SDN controller 148 with SDN routing instructions 150 for routing data along a data path defined by network data path elements (e.g., switches 152, 154, 156, 158, 160, and 162) between a source node 164 and destination node 166. In an SDN, control decisions for routing traffic through the network can be decoupled from the network's physical infrastructure. For example, in some SDNs, a network controller, such as SDN controller 148, can instruct network data path elements to flow traffic along a selected routing path defined by the network data path elements. Other functionality can be achieved through the use of software-defined networking. For example, SDN applications can be installed on or interface with a network controller to meet customer use cases, such as to achieve a desired throughput or other quality of service.

SDN controller 148 is connected to multiple network nodes via various wired or wireless data links. SDN 146 can be implemented through the use of an SDN controller 148 that interfaces with various SDN-compatible devices via a suitable Application Program Interface ("API"), or another suitable protocol (e.g., OpenFlow and/or simple network management protocol (SNMP)). In some implementations, SDN controller 148 may interface with controlled network devices via an interface channel that connects each controlled device to SDN controller 148 to allow SDN controller 148 to configure and manage each device, receive events from each device, and send packets using each device. As used herein, the term "controlled" in the context of SDN-compatible network data path elements, such as "controlled switches," is intended to include devices within the control domain of SDN controller 148. Such a controlled switch can, for example, communicate with SDN controller 148 and SDN controller 148 is able to manage the switch in accordance with an SDN protocol, such as the OpenFlow protocol. For example, an OpenFlow-compatible switch controlled by SDN controller 148 can permit SDN controller 148 to add, update, and delete flow entries in flow tables of the switch using suitable SDN commands. Each flow entry in a flow table can contain information such as: (1) match or hash fields to match against packets (e.g., an ingress port and packet headers), (2) a priority value for the flow entry to allow prioritization over other flow entries, (3) counters that are updated when packets are matched, (4) instructions to modify the action set or pipeline processing, (5) timeouts indicating a maximum amount of time or idle time before a flow is expired by the switch, and (5) a cookie value which can be used by the SDN controller to filter flow statistics, flow modification, and flow deletion.

In the example SDN 146 depicted in FIG. 6, the various network nodes are in the form of network data path elements (controlled network switches 152, 154, 156, 158, 160, and 162) and host devices (source node 164 and destination node 166). It is appreciated however, that the implementations described herein can be used or adapted for networks including more or fewer devices, different types of devices, and different network arrangements. It is further appreciated that the disclosure herein can apply to suitable SDNs (e.g., certain hybrid or heterogeneous SDNs) in which a subset of devices are controlled by an SDN controller and another subset of devices are not controlled by the SDN controller.

As described further below with respect to FIG. 7 and its related methods, SDN controller 148 includes machine-readable routing instructions 150, which can, for example, be used to route data between source node 164 and destination node 166. The functionality of SDN controller 148 can, for example, be implemented in part using a software program on a standalone machine, such as a server. In some implementations, SDN controller 148 can be implemented on multi-purpose machines, such as a suitable desktop computer, laptop, tablet, or the like. In some implementations, SDN controller 148 can be implemented on a suitable non-host network node, such as certain types of network switches. It is appreciated that the functionality of SDN controller 148 may be split among multiple controllers or other devices. For example, SDN 146 is described and illustrated as including only one SDN controller 148. However, it is appreciated that the improved systems, methods, and mediums described herein can be implemented in SDNs with multiple controllers. For example, in some SDNs, network devices are in communication with multiple controllers such that control of the network can be smoothly handed over from a first controller to a second controller if a first controller fails or is otherwise out of operation. As another example, multiple controllers can work together to concurrently control an SDN. In such SDNs, a first controller can, for example, control certain network devices while a second controller can control other network devices. In view of the above, reference in this application to a single SDN controller 148 that controls the operation of SDN 146 is intended to include such multiple controller configurations (and other suitable multiple controller configurations).

Similar to network 100 of FIG. 1 described above, data between source node 164 and destination node 166 can flow along distinct data paths within SDN 146. For example, a first path (referred to herein as a minimum cost path and depicted using solid lines in FIG. 6) between source node 164 and destination node 166 can flow data along switches 152, 156, and 158, and a second path (referred to herein as a non-minimum cost path and depicted using broken lines in FIG. 6) can flow data along switches 152, 154, 156, 160, and 162. As described above with respect to network 100 of FIG. 1, the terms "minimum" and "non-minimum" can correspond to the cost of transmitting data over each route. For ease of description, the costs of the two data paths of FIG. 6 are determined based on the hop count between source node 164 and destination node 166. In the example SDN 146 of FIG. 6, similar to network 100 of FIG. 1, the minimum cost path includes four hops to reach destination node 166 from source node 164, whereas the non-minimum cost path includes six hops to reach destination node 166 from source node 164.

Figure 7:
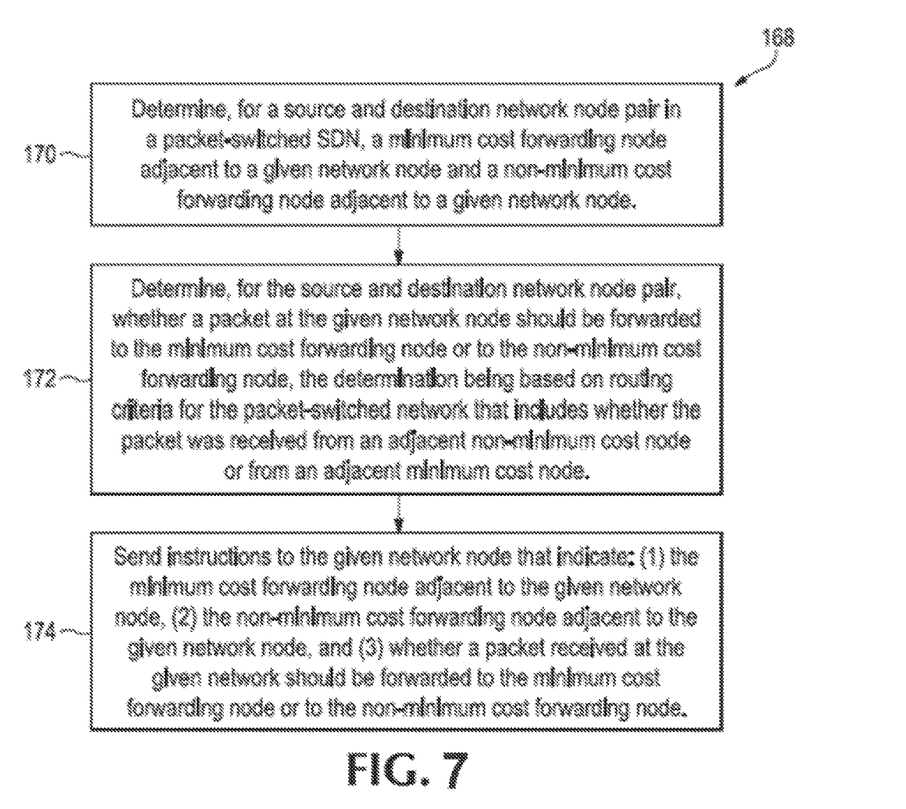
FIG. 7 is a flowchart illustrating a method, according to an example.

FIG. 7 illustrates a flowchart for a method 168 relating to routing data over SDN 146. For illustration, the description of method 168 and its component steps make reference to elements of example SDN 146, such as SDN controller 148 and switch 156. However, it is appreciated that this method can be used or otherwise applicable for any suitable network or network element described herein or otherwise.

Method 168 includes a step 170 of determining, for each source and destination network node pair in an SDN, a minimum cost forwarding node adjacent to each switch and a non-minimum cost forwarding node adjacent to each switch. This determination, which can be performed by SDN controller 148 can be performed in accordance with the method described above with respect to method 120. For example, the cost of each forwarding node can be based on a suitable cost metric or calculation. For ease of description, the cost metric for evaluation of data paths in the network of FIG. 6 is based on the number of hops between nodes. However, it is appreciated that another cost metric can be used (as described above with respect to method 120). In this implementation, there is only one source and destination network node pair (source node 164 and destination node 166). In this implementation, switch 156 serves as an example given switch, switch 158 serves as the minimum cost forwarding node relative to switch 156, and switch 160 serves as the non-minimum cost forwarding node relative to switch 156. It is appreciated that a different given switch within SDN 146 can have different minimum cost forwarding nodes and different non-minimum cost forwarding nodes.

In some implementations, step 170 can include determining, for each source and destination network node pair in SDN 146, multiple adjacent minimum cost forwarding nodes and multiple adjacent non-minimum cost forwarding nodes. Step 170 can further include selecting, for each source and destination network node pair in the SDN, one of the multiple minimum cost forwarding nodes and one of the multiple non-minimum cost forwarding nodes for forwarding purposes. In SDN 146, there is just one minimum cost forwarding node (switch 158) for given switch 156 and just one non-minimum cost forwarding node (switch 160) for given switch 156. However, in networks such as the network depicted in FIG. 9, which includes multiple minimum and non-minimum cost forwarding nodes, SDN controller 148 can select nodes for forwarding using any suitable selection criteria, such as relative cost of each potential node.

Method 168 includes a step 172 of determining, for each source and destination network node pair in SDN 146 and based on routing criteria for SDN 146 that includes whether an adjacent upstream node (e.g., switch 152 or 154) for each given switch (e.g., switch 156) is a non-minimum cost node, whether a packet at each given switch should be forwarded to the minimum cost forwarding node (e.g., switch 158) or to the non-minimum cost forwarding node (e.g., switch 160). This determination can be performed by SDN controller 148 and can be performed similarly to steps of method 120 described above with respect to FIG. 2. For example, the cost of each forwarding node can be based on a suitable cost metric or calculation.

Method 168 includes a step 174 of sending instructions to each controlled network node in SDN 146. The instructions can, for example, indicate: (1) the minimum cost forwarding node (e.g., switch 158) adjacent to the specific network node (e.g. switch 156), (2) the non-minimum cost forwarding node (e.g., switch 160) adjacent to the specific network node (e.g., switch 156), and (3) whether a packet received at the specific network node from a specific adjacent upstream node (e.g., switch 152 or switch 154) should be forwarded to the minimum cost forwarding node or forwarded to the non-minimum cost forwarding node. For example, SDN controller 148 can provide given switch 156 a first set of instructions based on a first set of network conditions for SDN 146 and can provide given switch 156 a second set of instructions based on a second set of network conditions for SDN 146. As but one example, suppose that based on the first set of conditions, SDN controller 148 favors the use of non-minimum cost forwarding node 160 to route traffic between given switch 156 and destination node 166. As such, the first set of instructions can indicate that packets sent from a minimum cost sending node should be forwarded by given switch 156 to non-minimum cost forwarding node 160. In order to avoid forwarding loops, the first set of instructions can further indicate that packets sent from a non-minimum sending node should be forwarded by given switch 156 to minimum cost forwarding node 158.

As another example, suppose that based on the second set of conditions, SDN controller 148 favors the use of minimum cost forwarding node 158 to route traffic between given switch 156 and destination node 166. As such, the second set of instructions can indicate that packets sent from a minimum cost sending node should be forwarded by given switch 156 to minimum cost forwarding node 158. The second set of instructions can further indicate that packets sent from a non-minimum sending node should also be forwarded by given switch 156 to minimum cost forwarding node 158.

As described above, given switch 156 may be able to determine whether packets are sent from a minimum cost sending node or a non-minimum cost sending node based on one or more suitable techniques. For example, in a first implementation, packets can be flagged by the sending node as to whether the sending node is a minimum or non-minimum cost sending node for a given source and destination node pair. Given switch 156 can, for example, determine whether the sending node is a minimum or non-minimum cost sending node based on the flag in the packet. In a second implementation, given switch 156 determine whether a packet is sent from a minimum or non-minimum cost sending node based on which port given switch 156 receives the packet. SDN controller 148 or another entity can provide instructions to given switch 156 to allow given switch 156 to be able to make such a determination. In some implementations, given switch 156 determines whether a packet is sent from a minimum or non-minimum cost sending node based on a source address and destination address for the packet. For example, given switch 156 may be able to determine a minimum cost route for a packet based on the source address and destination address of the packet.

In implementations where multiple minimum cost forwarding nodes are adjacent to the source node (e.g., switch 156) for a given data path, step 174 can include sending information to the source node that identifies the multiple minimum cost forwarding nodes to allow the source node to select a single minimum cost forwarding node for forwarding a packet along the data path. In some implementations, SDN controller 148 or another entity can select the minimum cost forwarding node for use by the source node.

In implementations where multiple non-minimum cost forwarding nodes are adjacent to the source node for a given data path, step 174 can include sending information to the source node that identifies the multiple non-minimum cost forwarding nodes to allow the source node to select a single non-minimum cost forwarding node for forwarding a packet along the data path. In some implementations, SDN controller 148 or another entity can select the non-minimum cost forwarding node for use by the source node. Although the flowchart of FIG. 7 and description of method 168 identify one order of performance, it is appreciated that this order may be rearranged into another suitable order, may be executed concurrently or with partial concurrence, include additional or comparable steps to achieve the same or comparable functionality, or a combination thereof.

Figure 8:
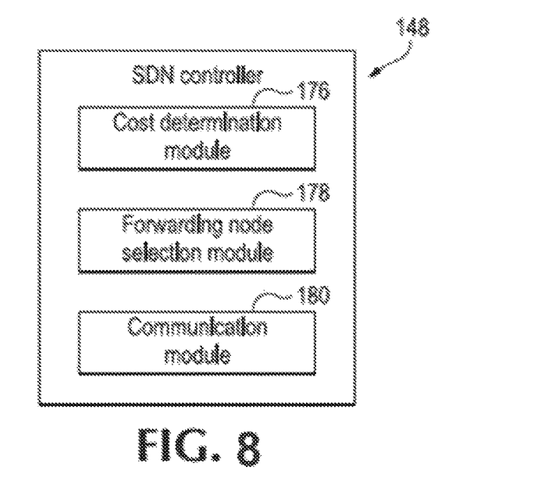
FIG. 8 is a diagram of a software-defined network controller, according to an example.

FIG. 8 illustrates SDN controller 148 in the form of functional modules that can be operative to execute one or more steps of method 168 described above. It is appreciated that SDN controller 148 can be in the form of a computing device, similar to computing device 132 and include a processor and machine-readable storage medium with SDN routing instructions 150. SDN controller 148 includes a cost determination module 176, forwarding node selection module 178, and communication module 180, as described further below. It is appreciated that other modules can be added to SDN controller 148 for additional or alternative functionality.

Cost determination module 176 of SDN controller 148 can determine, for each source and destination network node pair in an SDN, a minimum cost forwarding node adjacent to each given switch and a non-minimum cost forwarding node adjacent to each given switch. In some implementations, cost determination module 176 can determine, for each source and destination network node pair in the SDN, multiple adjacent minimum cost forwarding nodes and multiple adjacent non-minimum cost forwarding nodes.

Cost determination module 176 of SDN controller 148 can, for example, include one or more machine-readable storage mediums and one or more computer processors to implement one or more aspects of step 170 (or other steps) of method 168 described above. In some implementations, cost determination module 176 includes hardware in the form of a hard drive, related firmware, and other software for allowing the hard drive to operatively communicate with other hardware of SDN controller 148. Cost determination module 176 can include information for use with cost determination module 176, which can include instructions for determining minimum and non-minimum cost forwarding nodes.

Forwarding node selection module 178 of SDN controller 148 can determine, for each source and destination network node pair in the SDN and based on routing criteria for the packet-switched network that includes whether an adjacent upstream node for each given switch is a non-minimum cost node, whether a packet at each given switch should be forwarded to the minimum cost forwarding node or to the non-minimum cost forwarding node. In some implementations, forwarding node selection module 178 is to select, for each source and destination network node pair in the SDN, one of the multiple minimum cost forwarding nodes and one of the multiple non-minimum cost forwarding nodes.

Forwarding node selection module 178 can, for example, include one or more machine-readable storage mediums and one or more computer processors to implement one or more aspects of step 172 (or other steps) of method 168 described above. In some implementations, forwarding node selection module 178 includes hardware in the form of a hard drive, related firmware, and other software for allowing the hard drive to operatively communicate with other hardware of SDN controller 148. Forwarding node selection module 178 can include information that is stored for use with forwarding node selection module 178, which can include routing criteria.

Communication module 180 of SDN controller 148 sends instructions to each controlled network node in the SDN indicating: (1) the minimum cost forwarding node adjacent to the specific network node, (2) the non-minimum cost forwarding node adjacent to the specific network node, and (3) whether a packet received at the specific network node from a specific adjacent upstream node should be forwarded to the minimum cost forwarding node or to the non-minimum cost forwarding node. In some implementations, communication module 180 is to send instructions to each controlled network node in the SDN indicating: (1) the selected minimum cost forwarding node adjacent to the network node, (2) the selected non-minimum cost forwarding node adjacent to the network node, and (3) whether a packet received at the network node from a specific adjacent upstream node should be forwarded to the selected minimum cost forwarding node or forwarded by the source node to the selected non-minimum cost forwarding node.

Communication module 180 can, for example, include one or more machine-readable storage mediums and one or more computer processors to implement one or more aspects of step 174 (or other steps) of method 168 described above. Communication module 180 can be implemented for use as a wired or wireless communication interface. In some implementations, communication module 180 contains one or more physical data ports to connect to elements of SDN 146. For example, in some implementations, communication module 180 can include a network interface controller having an Ethernet port. In some implementations, communication module 180 includes hardware in the form of a hard drive, related firmware, and other software for allowing the hard drive to operatively communicate with other hardware of SDN controller 148. Communication module 180 can include information for use with communication module 180, such as firmware for using physical or virtual communication ports.

In some implementations, SDN controller 148 can include an I/O module to allow communication to and from SDN controller 148. Example of suitable I/O modules can include modules for monitors, printers, keyboards, mouses, styluses, touchscreens, speakers, etc. I/O devices for such modules can be connected to elements of SDN controller 148 via wired or wireless links.

FIG. 9 is a diagram of an example software-defined network (SDN) 182 including an SDN controller 148 with routing instructions 150 for routing data along a data path defined by network data path elements (e.g., switches 184, 186, 188, 190, 192, 194, 196, 198, and 200) between a source node 202 and destination node 204. SDN 182 illustrates an example SDN in which a given switch 188 is connected to multiple adjacent minimum cost forwarding nodes (switches 190 and 192 in this example) and multiple adjacent non-minimum cost forwarding nodes (switches 194 and 196). For ease of description, the cost metric for evaluation of data paths in SDN 182 is based on the number of hops between each node and destination node 204. However, it is appreciated that another cost metric can be used (as described above with respect to method 120). As a result, multiple minimum cost paths between source node 202 and destination node 204 are available (e.g., a first minimum cost path along switches 184, 188, and 190 and a second minimum cost path along switches 184, 188, and 192). Multiple non-minimum cost paths are also available between source node 202 and destination node 204 (e.g., a first non-minimum cost path along switches 184, 186, 188, 194, and 198 and a second non-minimum cost path along switches 184, 186, 188, 196, and 200).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, apparatuses, and methods described herein can include various combinations and/or sub-combinations of the components and/or features of the different implementations described. Thus, features described with reference to one or more implementations can be combined with other implementations described herein.

What is claimed is:

1. A method comprising:
   receiving, by a receiving node, a packet sent from a sending node, the receiving node and the sending node being adjacent network nodes in a packet-switched network;
   determining, for a destination node of the packet, a first data structure storing information of a minimum cost forwarding node and a second data structure storing information of a non-minimum cost forwarding node, the minimum cost forwarding node and the non-minimum cost forwarding node being adjacent network nodes to the receiving node, wherein the first and second data structures are lookup tables;
   determining, based on a marking on the packet and an ingress port of the packet, a sending node category indicating whether the sending node is a non-minimum cost node between a source node and the destination node for the packet;
   determining, for the packet, a forwarding node category based on the sending node category and a set of routing criteria, wherein the forwarding node category indicates whether a forwarding node for the packet is the minimum cost forwarding node or the non-minimum cost forwarding node;
   selecting a data structure from the first and second data structures based on the forwarding node category; and
   determining, from the selected data structure, the forwarding node for the packet.

2. The method of claim 1,
   wherein the minimum cost forwarding node and the non-minimum cost forwarding node are determined based on a number of hops between the minimum cost forwarding node and the destination node, and a number of hops between the non-minimum cost forwarding node and the destination node, respectively.

3. The method of claim 1,
   wherein the minimum cost forwarding node and the non-minimum cost forwarding node are determined based on a number of available paths between the minimum cost forwarding node and the destination node, and a number of available paths between the non-minimum cost forwarding node and the destination node, respectively.

4. The method of claim 1,
   wherein the minimum cost forwarding node and the non-minimum cost forwarding node are determined based on an overall link speed between the minimum cost forwarding node and the destination node, and an overall link speed between the non-minimum cost forwarding node and the destination node, respectively.

5. The method of claim 1, wherein the set of routing criteria indicates that the forwarding node is the minimum cost forwarding node in response to determining that the sending node is a non-minimum cost node.

6. The method of claim 1, wherein the set of routing criteria indicates that the forwarding node is the non-minimum cost forwarding node in response to determining that:
the sending node is a minimum cost node,
a congestion on a minimum cost path to the destination node is above a first threshold, and
a congestion on a non-minimum cost path to the destination node is below a second threshold.

7. The method of claim 6, wherein the congestion on the minimum cost path is based on a throughput of the minimum cost path.

8. A network switch, comprising:
a receiving module configured to receive a packet sent from an upstream node, the network switch and the upstream node being adjacent network nodes in a packet-switched network;
a cost determination module configured to determine, for a destination node of the packet, a first data structure storing information of a minimum cost forwarding node adjacent to the network switch and a second data structure storing information of a non-minimum cost forwarding node adjacent to the network switch, wherein the first and second data structures are lookup tables;
a selection module configured to determine, based on a marking on the packet and an ingress port of the packet, an upstream node category indicating whether the upstream node is a non-minimum cost node between a source node and the destination node for the packet; and
a forwarding module configured to:
determine, for the packet, a forwarding node category based on the upstream node category and a set of routing criteria, wherein the forwarding node category indicates whether a forwarding node for the packet is the minimum cost forwarding node or the non-minimum cost forwarding node;
select a data structure from the first and second data structures based on the forwarding node category; and
determine, from the selected data structure, the forwarding node for the packet.

9. The network switch of claim 8, further comprising a routing module configured to execute a link-state routing protocol to determine the minimum cost forwarding node and the non-minimum cost forwarding node.

10. The network switch of claim 8,
wherein the routing criteria indicates that the forwarding node is the minimum cost forwarding node in response to determining that the sending node is a non-minimum cost node, and
wherein the routing criteria indicates that the forwarding node is the non-minimum cost forwarding node in response to determining that a congestion on a minimum cost path to the destination node is above a first threshold and a congestion on a non-minimum cost path to the destination node is below a second threshold.

11. A software-defined network (SDN) controller, comprising:
a determination module configured to determine, for a source and destination network node pair of a dataflow in a packet-switched SDN, a minimum cost forwarding node adjacent to a network node and a non-minimum cost forwarding node adjacent to the network node;
a forwarding node selection module configured to determine, for the source and destination network node pair, a set of instructions for the network node, wherein the set of instructions instruct the network node to:
determine, based on a marking on a packet of the dataflow and an ingress port of the packet, a sending node category indicating whether a sending node is a non-minimum cost node between the source and destination network node pair; and
select, for the packet based on the sending node category and a set of routing criteria, a forwarding node from the minimum cost forwarding node and the non-minimum cost forwarding node; and
a communication module configured to send the set of instructions to the network node.

12. The method of claim 1, wherein the first and second data structures are hash tables.

13. The method of claim 1, wherein determining the forwarding node for the packet further comprises:
determining that the packet is eligible for forwarding to the non-minimum cost forwarding node; and
selecting the minimum cost forwarding node as the forwarding node based on a selection criteria.

14. The method of claim 1, further comprising executing a link-state routing protocol to determine the minimum cost forwarding node and the non-minimum cost forwarding node.

15. The network switch of claim 8, wherein the minimum cost forwarding node and the non-minimum cost forwarding node are determined based on a set of parameters associated with the destination node, wherein the set of parameters includes one or more of: a number of hops, a number of available paths, and an overall link speed.

16. The network switch of claim 8, wherein the first and second data structures are hash tables.

17. The network switch of claim 8, wherein determining the forwarding node for the packet further comprises:
determining that the packet is eligible for forwarding to the non-minimum cost forwarding node; and
selecting the minimum cost forwarding node as the forwarding node based on a selection criteria.

18. The SDN controller of claim 11, wherein the minimum cost forwarding node and the non-minimum cost forwarding node are determined based on a set of parameters associated with the destination node, wherein the set of parameters includes one or more of: a number of hops, a number of available paths, and an overall link speed.

* * * * *